United States Patent Office 3,534,980
Patented Oct. 20, 1970

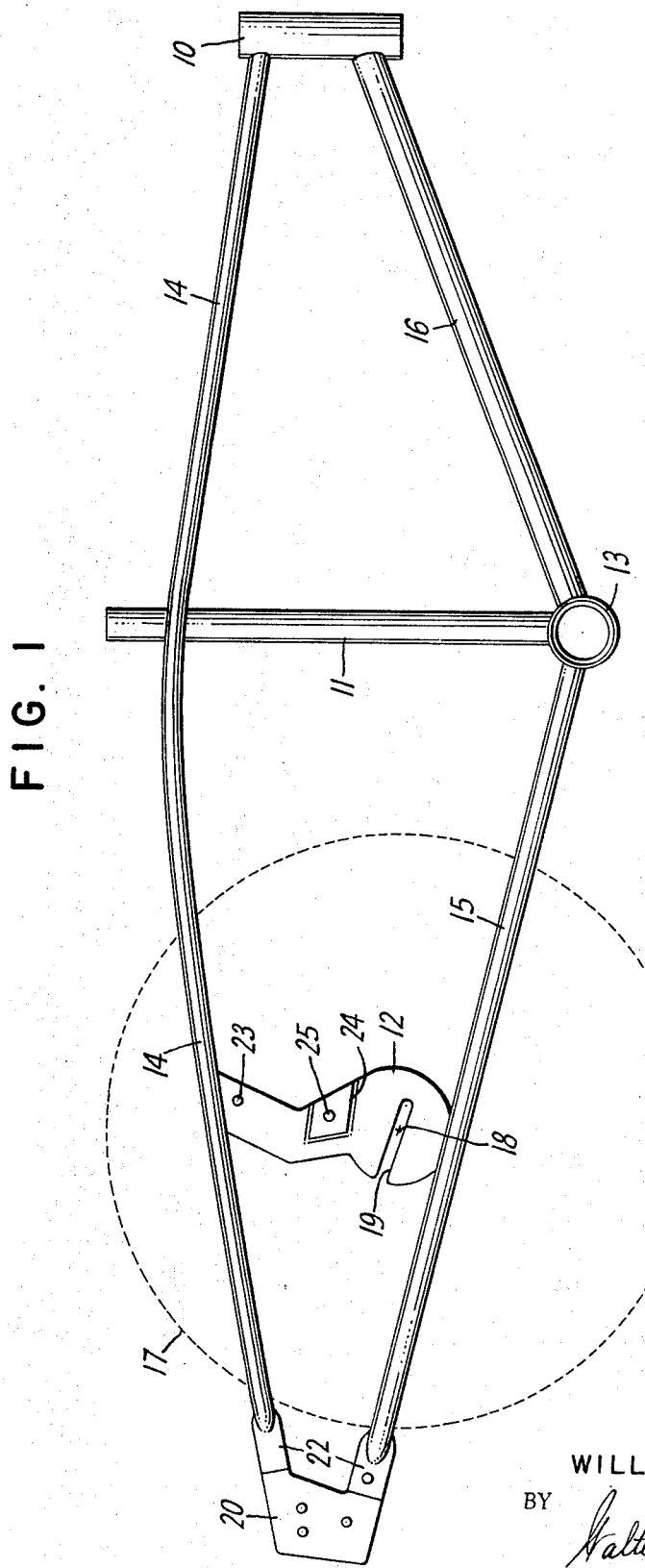

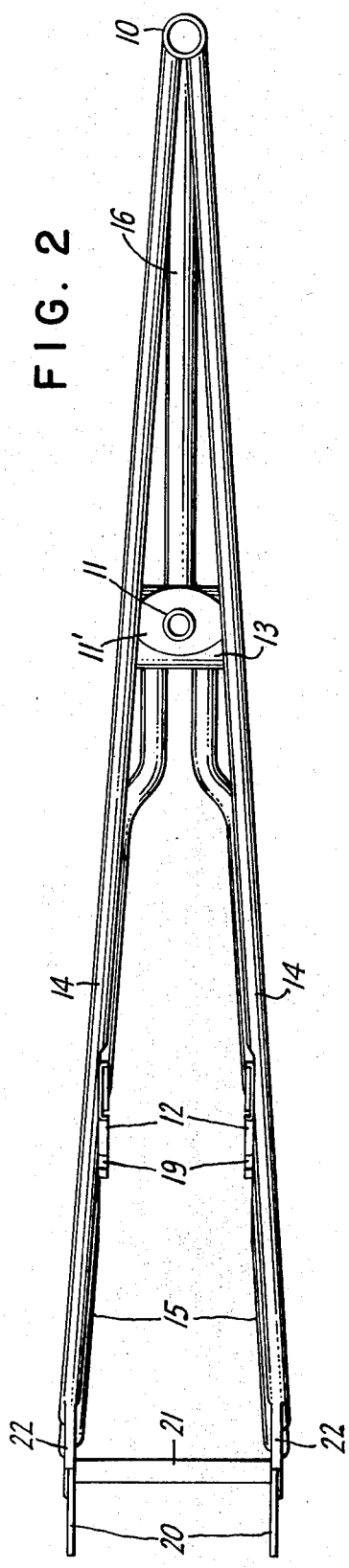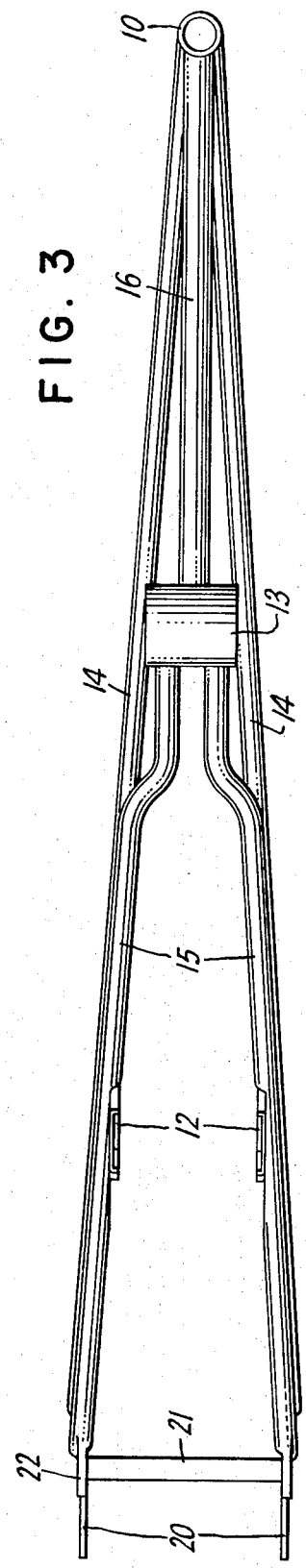

3,534,980
BICYCLE FRAME
William F. Jacoby, Little Rock, Ark., assignor to American Machine & Foundry Company, a corporation of New Jersey
Filed Nov. 7, 1968, Ser. No. 774,118
Int. Cl. B62k 3/02
U.S. Cl. 280—281                    3 Claims

ABSTRACT OF THE DISCLOSURE

The top and bottom rear bars of the frame are extended rearwardly past the rear wheel axle mounting means to a location beyond the periphery of the rear wheel where they are joined together.

---

This invention relates to a bicycle frame, and more particularly, to an improved bicycle frame having advantages and features not found in previous bicycle constructions.

Briefly, in my invention, the twin top and bottom rear frame bars or tubes of a bicycle are extended in a rearward direction past the rear wheel axle mounting means to a location beyond the periphery of the rear wheel where they are joined together. This construction provides a rigid frame in which additional wheels or rollers can be mounted on the frame behind the rear wheel for the purpose of doing trick riding with the bike, such as causing the bike to assume a raised attitude wherein the user rides just on the rear wheel.

The features of the invention which are believed to be novel are set forth with particularity in the appended claims. The invention itself, however, both as to its organization and operation, together with further objects and advantages thereof, may best be understood by reference to the following description taken in connection with the accompanying drawings in which:

FIG. 1 is a side elevation view of the improved bicycle frame of my invention;

FIG. 2 is a top plan view of the frame of FIG. 1; and

FIG. 3 is a bottom plan view of the frame of FIG. 1.

Referring now particularly to the drawings, shown therein is a bicycle frame comprising a front steering means head post 10, an intermediate seat post 11, and rear wheel axle mounting means 12. The bottom of seat post 11 has a pedal hanger tube 13 connected hereto. The elements 10-12 are generally parallel to each other and extend in a vertical direction, whereas hanger tube 13 is horizontally disposed in perpendicular relationship to seat post 11. Posts 10 and 11 are hollow tubes for the purposes of mounting a not shown front wheel steering fork in or on post 10 and a not shown seat supporting rod in post 11, in a manner which will be obvious to those skilled in the art.

The elements 10-12 are connected together into a rigid frame assembly by top and bottom bars or tubes 14 and 15, 16 respectively. The top bars 14 comprise a pair of laterally spaced tubes which extend continuously from the top of post 10 to the top of post 11 and then to the top of means 12 past means 12 to their rearmost ends. Tubes 14 are connected to posts 10 and 11 and means 12 by means such as welds. In the case of post 10 and means 12 the tubes 14 are directly connected thereto. In the case of post 11 the tubes 14 are connected thereto through a spacer plate 11', see FIG. 2.

At the bottom of the frame a single bar or tube 16 extends between the bottom of posts 10 and 11. The rear bottom bars 15 comprise a pair of tubes which are laterally spaced with respect to each other. They extend between the bottoms of post 11 and means 12 to well past means 12 as in the case of top rear tubes 14. Bars 15 and 16 are also connected to elements 10-12 by means such as welding. The inner ends of bars 15, 16 are connected to the bottom end of post 11 by being connected to the hanger tube 13 which in turn is connected to post 11.

The rear wheel, which is schematically indicated by the broken line circle 17, has its axle, which is indicated schematically by the cross 18 mounted in the rear wheel axle mounting means 12. The means 12 comprises a pair of parallel spaced plates which are connected at their opposite ends to the top and bottom bars 14 and 15 on their corresponding sides of the frame. The plates 12 have open ended aligned notches 19 formed therein for the purpose of receiving the wheel axle 18 therein to mount the rear wheel 17 on the frame.

As will clearly be seen in FIG. 1, the front ends of bars 14 and the bar 16 extend in a forward direction from the center seat post 11 in converging relationship with respect to each other towards the forward post 10. The same is true of the bars 14 and 15 when progressing in a rearward direction from the center seat post 11. In prior art bicycle frames the twin top and bottom bars 14 and 15 would extend towards and terminate at or adjacent rear wheel axle mounting means such as slots 19. In my invention the rear wheel axle mounting means 12 is located intermediate the center seat post 11 and the rearmost ends of bars 14 and 15. That is to say, bars 14 and 15 extend rearwardly clear past the rear wheel axle mounting means 12 to a point or location beyond or behind the rear peripheral portion of the rear wheel 17. At their rearmost ends the tubes 14 and 15 are joined together by generally U-shaped plates 20 and a cross brace 21. The rearmost ends of tubes 14, 15 have hollow flattened portions 22 which are adapted to receive the leg portions of the U-shaped plates 20. The cross brace 21 is connected at its opposite ends to the parallel and laterally spaced rear plates 20. Parts 20-22 rigidize the rear end of the frame and provide means for mounting a rear wheel or roller subassembly on the bicycle behind the rear wheel 17 for the purpose of doing trick riding with the bicycle just on the rear wheel, in a manner which is well known in the art. It will be obvious that other cross braces between the tubes 14 and 15 besides the rear one 21 can be added to the frame to further brace the tubes and strengthen the frame. These expedients are well understood in the art and therefore have been excluded from the drawings so that only the bare essentials of the frame are shown to better highlight the novel aspects of the instant invention.

The novel frame of my invention provides other advantages besides providing a strong rear support for a rear third wheel or roller for doing trick riding. For example, side reflectors can be conveniently mounted on the outer sides of plates 12. Also, one of the plates 12 can be used as the means for fixing the brake arm of the rear axle coaster brake. This is indicated by the aperture 23, see FIG. 1, in one of plates 12 for purposes of bolting the brake arm in fixed position. One of the rear plates 12 can also be used as the place for fixing the rear end of the sprocket chain guard or cover. This is indicated by the offset 24 in one of plates 12, said offset having a bolt hole 25, see FIG. 1. In addition, although post 11 is a primary seat support, it will be understood that there are seats, such as the elongated "banana" shaped seat which is quite popular and needs additional support. Such elongated seats can be supported at their rear ends off either or both of the plates 12 and 20 by suitable struts connected thereto. The just mentioned elements such as the side reflectors, brake arm, the chain guard, and the elongated "banana" type seat have not been illustrated in the drawings for purposes of highlighting just the novel frame of the instant invention and also for the reason that they are elements which are well known in the art. However, they are generally referred to for the purpose of explaining that the improved frame of the instant invention has advantages and features not found in previous bicycle constructions.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What is claimed is:

1. In a bicycle frame having a front steering means support head post, rear wheel axle mounting means, an intermediate seat post having a bottom pedal hanger tube connected thereto, and top and bottom support means extending between said posts and rear wheel axle mounting means; the improvement of said support means comprising a pair of laterally spaced bars connected to the top and bottom of said seat post and extending rearwardly therefrom toward and past said rear wheel axle mounting means to a location beyond the periphery of a rear wheel to be mounted on said rear wheel axle mounting means, means connecting the rearmost ends of said bars together, said rear wheel axle mounting means being positioned intermediate said seat post and said rearmost connecting means, said rear wheel axle mounting means comprising a pair of parallel and laterally spaced plates, said plates being connected at their opposite ends to the top and bottom bars at their respective sides of the frame, and a pair of parallel open ended notches formed in said plates which are adapted to receive opposite ends of an axle of a rear wheel.

2. In a bicycle frame as in claim 1, said top pair of bars being connected to said seat post by a spacer plate connected to the top of said seat post, said top pair of bars also extending in a forward direction to said head post and being connected thereto, said bottom pair of bars being connected to said seat post by said hanger tube, and another bottom bar extending from said hanger tube in a forward direction and being connected to said head post, all the top and bottom bars of said frame extending from said seat post to the front and rear of said frame in converging relationship.

3. In a bicycle frame as in claim 2, a pair of parallel laterally spaced and generally U-shaped plates connected to the rearmost ends of said top and bottom bars, and a cross brace extending between said U-shaped plates and connected at its opposite ends thereto, all said posts and plates exclusive of said spacer plate being generally parallel to each other in a vertical direction, and a rear wheel mounted on said rear wheel axle mounting means, said rear wheel being disposed between the rear wheel axle mounting plates and top and bottom bars of said frame and between said seat post and said cross brace.

References Cited
UNITED STATES PATENTS

| | | | |
|---|---|---|---|
| 634,062 | 10/1899 | Mathews | 280—239 |
| 1,427,589 | 8/1922 | Greenison | 280—281 |
| 3,284,096 | 11/1966 | Hansen et al. | 280—239 |

BENJAMIN HERSH, Primary Examiner

R. R. SONG, Assistant Examiner